United States Patent Office 2,816,092
Patented Dec. 10, 1957

2,816,092

METHOD OF DRYING IMPROVED CATIONIC UREA-FORMALDEHYDE RESINS

Ralph E. Kelly, New Castle, Del., assignor to Hercules Powder Company, Wilmington, Del., a corporation of Delaware No Drawing. Application November 17, 1953, Serial No. 392,760

12 Claims. (Cl. 260—71)

This invention relates in general to a process of drying cationic urea-formaldehyde resins.

An ever important problem in the manufacture of paper has been the preparation of a wet strength paper whereby the paper is resistant to tearing or breaking even when wet. This property of increased strength and particularly wet strength has been imparted to the paper through the incorporation in a paper furnish of a urea-formaldehyde resin, but previously the incorporation of such a resin in the paper furnish has been accomplished by precipitating the resin or by utilizing a resin which has been partly polymerized and which is characterized by being in the gel state or nearly in the gel state with the result that the urea-formaldehyde resin is mechanically entrained on the paper fibers.

More recently, high wet strength and dry strength paper products have been prepared by the addition thereto of a partially polymerized hydrophilic cationic urea-formaldehyde resin which contains as a modifier a water-soluble polyfunctional organic nitrogen base. A description of these resins is contained in U. S. Patent No. 2,554,475 to Tzeng-Jiueq Suen et al.; Canadian Patent No. 467,505 to John H. Daniel, Jr., et al.; in Canadian Patent No. 468,512 to Gerald I. Keim; and in the copending application of Gerald I. Keim, Serial No. 341,889, filed March 12, 1953. These modified resins are substantive to the paper fibers, i. e., they are characterized by substantial exhaustion onto the paper fibers and even distribution thereon without the need of addition of a precipitating or fixing agent. The use of such resins leads to a process for preparing a paper of extraordinarily high wet strength by a practicable process easily adaptable to existing paper machinery.

In making cationic modified urea-formaldehyde resins, thiourea, or a mixture of urea and thiourea, may be used in place of urea, while any methylene-yielding substance, such as paraformaldehyde or hexamethylenetetramine, may be substituted for formaldehyde. The ratio of methylene-yielding substance to urea, thiourea, or mixture thereof is not critical. When formaldehyde is used, the preferred ratio is from 1.8 to 2.8 moles of formaldehyde per mole of urea, thiourea, or mixture thereof. Hereafter the invention will be discussed in terms of urea and formaldehyde as the primary reactants, but it is understood that any methylene-producing substance, as stated above, may be used in place of formaldehyde and that either thiourea or mixtures of thiourea with urea may be used in place of urea.

The water-souble polyfunctional organic nitrogen bases used to modify the urea-formaldehyde resins are alkylenepolyamines of the formula $H_2N(C_nH_{2n}HN)_xH$ in which $n$ is two or more and $x$ is one or more, such as ethylenediamine and 1,3-propylenediamine and polyalkylenepolyamine such as diethylenetriamine, triethylenetetramine, tetraethylenepentamine; the corresponding polypropylenepolyamines and polybutylenepolyamines; also guanidines, biguanides, the guanylureas and the salts thereof; condensation products of alkylenepolyamines, such as the above with halohydrins such as α-dichlorhydrin, epichlorhydrin, and the like; monoalkylolamines, dialkylolamines, and the like; and the water-soluble condensation products thereof with aldehydes such as formaldehyde. The amount of water-soluble polyfunctional organic nitrogen base used may vary widely. Generally, from about 3% to about 44% of the polyfunctional base, based on the weight of the urea, is preferred. The polyalkylenepolyamines are the preferred polyfunctional bases for the purpose of this invention.

It is preferred to heat all the ingredients together for a short period of time under alkaline conditions and then for a relatively long period of time under acid conditions until a resin sirup of the desired viscosity is formed. If desired, the alkaline reaction can be omitted and the entire reaction carried out under acid conditions. An alternative procedure for making the resins involves reacting urea and formaldehyde under alkaline conditions followed by addition of the water-soluble polyfunctional organic nitrogen base and reaction under acid conditions until a resin having the desired viscosity is achieved. In general, as set forth in the art, cationic modified urea-formaldehyde resins suitable for use as wet strength resins should have a viscosity of at least about D on the Gardner-Holdt scale as measured at 25° C. on an aqueous solution having 45% solids by weight.

These resins, while representing a great advance over the prior art in flexibility of use on the paper machine and in the quality of the product produced, nevertheless suffer a very serious drawback in that all are characterized by the fact that not more than about 50% of the resin is retained by the paper when the resin is added to the water suspension of paper stock, i. e., at any point of the paper-making machine ahead of the wire or screen. This is clearly shown by Fig. 1 of Canadian 467,505. As this is the principal method used commercially to incorporate these resins in paper, this is a serious drawback. The recirculation of part of the white water retains part of the otherwise lost urea-formaldehyde resin in the water system but has not proved a satisfactory answer. Thus, it is necessary to run part of the white water to the sewer in order to prevent the accumulation of dissolved substances in the paper mill systems. These substances, if allowed to accumulate indefinitely, tend to cause trouble with foaming, slime growth, poor sizing and sticking on the press rolls. In addition, it has been found that recirculation of the white water does not result in any saving of urea-formaldehyde resin as would be expected from the amounts of resin present in the white water.

In the recently filed applications of Gerald I. Keim, there are disclosed processes whereby there are obtained cationic resins of greatly improved utility in producing high wet strength paper. These improved resins are substantially completely retained by the paper when added to a water suspension of paper fibers. It is possible to obtain the same wet strength with the use of only about one-half the amount of the resins described by Gerald I. Keim as was necessary with the prior art cationic urea-formaldehyde resins. Conversely, it is possible to obtain approximately a 30% increase in wet strength by using the same amount of the new cationic resin to treat paper as of the prior art resin.

Thus, in application Serial No. 375,829 of Gerald I. Keim, filed August 21, 1953, Patent No. 2,786,823, an aqueous solution of a cationic urea-formaldehyde organic nitrogen base resin, produced as set forth above, is treated with an appropriate anion, namely, a sulfate ion. The anion is added in the form of a water-soluble salt or in the form of the acid. As a result of this treatment, a fraction of the original resin is precipitated. This precipitated resin possesses the unique property of being substantially completely retained on the paper fibers.

Another method of producing these highly efficient cationic urea-formaldehyde resins is disclosed in application Serial No. 375,826 of Gerald I. Keim, filed August 21, 1953, Patent No. 2,786,826, wherein it is disclosed that an aqueous solution of a cationic urea-formaldehyde resin modified by a water-soluble polyfunctional organic nitrogen base, which resin has been produced by any of the methods set forth above, is treated with an appropriate cation, namely, an ammonium or alkali metal ion. The cation is added in the form of a water-soluble salt whose solution at the concentration used has a pH of less than about 8. As a result of this treatment, a fraction of the original resin is precipitated. This precipitated fraction has the unique property of being substantially completely retained by the paper fibers.

A third method is disclosed in application Serial No. 375,827 of Gerald I. Keim, filed August 21, 1953, Patent No. 2,786,824. Therein it is disclosed that an aqueous solution of a cationic urea-formaldehyde resin modified by a water-soluble polyfunctional organic nitrogen base, which resin has been produced by any of the methods set forth above, is treated with an appropriate basic material, namely, an organic base, an inorganic base or a basic salt in such amount as to provide a pH of about 8.5 or greater in the aqueous solution. As a result of this treatment, a fraction of the original resin is precipitated. This precipitate possesses the unique property of being substantially completely retained by the paper fibers.

Still another method is disclosed in application Serial No. 385,693 of Gerald I. Keim, filed October 12, 1953, Patent No. 2,786,825. Therein it is disclosed that an aqueous solution of a cationic urea-formaldehyde resin modified by a polyalkylenepolyamine, which resin has been produced by any of the methods set forth above, is treated by lowering the temperature of the resin solution at least to about 10° C. As a result of this treatment, a fraction of the original resin is precipitated. This precipitate possesses the unique property of being substantially completely retained by the paper fibers.

All of these novel resins obtained by Gerald I. Keim are obtained in the form of an aqueous sludge generally having a solids content of about 30%, although this may vary from about 20% to about 45% solids. It has not been possible to dry any of these resins by any of the means normally known to the art such as drum or roll drying, either with or without a vacuum. Such drying treatments as these, when used on these novel resins, have resulted in the formation of appreciable amounts of insoluble resin. Now in accordance with the present invention there has been discovered a process whereby the novel and highly useful resins obtained by Gerald I. Keim may be dried.

The resin sludes such as are obtained by any of applications Serial No. 375,826, 375,827, 375,829 and 385,693 of Gerald I. Keim are dried by treating the sludge with an appropriate organic compound, namely, a neutral water-miscible, oxygen-containing organic liquid. These compounds are completely water-miscible or substantially completely water-miscible and include monohydric alcohols such as methanol, ethanol, propanol, isopropanol and tertiary butyl alcohol; ketones such as acetone; and ethers such as dioxane and methoxymethane. These compounds all contain carbon, hydrogen and oxygen as their sole components. The resulting resin dispersions are mixed thoroughly and then may be dried by any of the means known to the art such as vacuum drying, vacuum drum drying and spray drying. It is preferred to concentrate the resin dispersion prior to drying the resin. This concentration may be accomplished by any of the means known to those skilled in the art such as filtering, centrifuging, or allowing the precipitate to settle and then decanting the supernatant liquid or draining off the lower layer. As a result of this treatment, there is obtained in dry form the cationic urea-formaldehyde resins which have the unique property of being substantially completely retained by the paper fibers. These dry resins are substantially completely soluble in water. In resolubilizing the dry resin, it is preferred to add to the water a very minor amount of acid to aid the rate of solution.

The general nature and form of the invention having been set forth and described the following examples are presented in illustration but not in limitation of the invention. All parts and percentages are by weight unless otherwise specified.

EXAMPLE 1

A solution was prepared containing 864 parts of urea and 2,608 parts of 37% formaldehyde which was methanol-free. To this was added 116.8 parts of triethylenetetramine. The solution was refluxed for 5 minutes and then 80 parts of 90% formic acid were added. The solution was again heated to reflux (about 102° C.) and maintained at this temperature until the viscosity, as determined on a 44% aqueous solution, had risen to U–V on the Gardner-Holdt scale at 25° C. The solution was then cooled, neutralized with sodium hydroxide to stop further polymerization and diluted with water to give a 30% solids solution. One portion of this solution was used as a control.

To another portion of the resin solution constituting 1500 parts was added sufficient of a 25% solution of sodium hydroxide to adjust the pH of the solution to 9.6. A precipitate formed and was allowed to settle to the bottom. The supernatant liquid was decanted and to the resulting sludge was added 800 parts of methanol. The mixture was stirred vigorously and again the precipitate was allowed to settle. The supernatant liquid was again decanted and an additional 800 parts of methanol stirred into the dispersion. The dispersion was then filtered and the precipitate dried in a vacuum desiccator. By this means there were obtained 124 parts of a light yellow, powdery solid. Based on the starting resin solids, this constituted a 28% yield. The solid so obtained was slightly hygroscopic, but no special precautions were necessary to maintain dryness. Eight parts of dry resin were then added to 350 parts of water which contained one part of a 90% formic acid solution. The mixture was stirred vigorously to dissolve the resin. This solution was then neutralized with a 25% solution of sodium hydroxide and diluted to a total of 400 parts. By this means there was obtained a 2% solution of the resin.

A bleached sulfite pulp was beaten to a Schopper-Riegler freeness of 750 cc. The slush stock was adjusted to a pH of 4.5 with papermaker's alum. Varying amounts of the 2% resin solution were added to the stock and handsheets formed therefrom using a Noble and Wood handsheet machine. The handsheets so prepared had a basis weight of 40 lb./ream. Table I lists the wet tensile values obtained with varying amounts of both the untreated and the treated resin. Wet tensile values are given both for uncured sheets and for sheets which had been cured for one hour at 105° C. The handsheets were soaked in water for 2 hours prior to obtaining the wet tensile values.

Table 1

| Test No. | (A represents the untreated resin, while B represents the precipitated resin) | Amount of Resin Added, percent | Wet Tensile Strength (lb./in.) | |
|---|---|---|---|---|
| | | | Uncured | Cured |
| 1 | A | 1 | 3.6 | 4.9 |
| 2 | B | 1 | 4.7 | 6.4 |
| 3 | A | 2 | 5.0 | 6.4 |
| 4 | B | 2 | 6.0 | 8.3 |
| 5 | A | 3 | 5.8 | 7.2 |
| 6 | B | 3 | 6.6 | 8.4 |

EXAMPLE 2

One thousand parts of a resin sirup, prepared as in Example 1, were treated with sodium hydroxide as in Example 1. There was obtained a sludge containing 418 parts. To this sludge was added with vigorous stirring 2000 parts of methanol. The dispersion was filtered and resuspended in an additional 400 parts of methanol, refiltered and dried over $P_2O_5$ in a vacuum desiccator. There were obtained as a result of this treatment 99 parts of a dry solid, representing a yield based on the starting resin solids of 33%. A 4% aqueous solution of this resin was easily prepared by dissolving 8.0 parts of the resin in 200 parts of water which contained 0.08 part of a 90% formic acid solution. There was obtained by this method a clear solution having a pH of 7.1.

When the 4% solution was evaluated as a wet strength resin in a bleached sulfite pulp as in Example 1, 1% of the resin based on the weight of the paper was as efficient in promoting wet strength as 2% of the untreated resin.

EXAMPLES 3 THROUGH 7

A resin sirup was prepared and precipitated as set forth in Example 1. Thirty-part portions of the resulting sludge were treated with varying amounts of methanol. Table II sets forth the amount of methanol per 30 parts of sludge and the amount of dry solid obtained expressed as percent of the starting resin solids.

*Table II*

| Example No. | Parts Methanol Per 30 Parts Resin Sludge | Yield (percent) |
|---|---|---|
| 3 | 400 | 31 |
| 4 | 200 | 32 |
| 5 | 2 portions 80 parts each | 28 |
| 6 | 2 portions 60 parts each | 29 |
| 7 | 3 portions 40 parts each | 26 |

Clear aqueous solutions were easily prepared by dissolving 5 parts of each of the dry resins obtained in Examples 3 through 7 in 100 parts of water which contained 0.1 part of a 90% formic acid solution. When evaluated as wet strength resins in a bleached sulfite pulp as in Example 1, 1% of each of the dried resins of Examples 3 through 7 based on the weight of the paper was as efficient in promoting wet strength in the paper as 2% of the untreated resin.

The amount of organic liquid used is not critical as can be seen from the examples. In general, a minimum amount of organic liquid which should be used is an amount about four times the total weight of the aqueous resin dispersion or sludge, while the maximum amount is limited only by that amount which would be economical to handle. When the lower amounts of organic liquids are used, i. e., from an amount about four times the total weight of the aqueous resin dispersion to an amount about six times the toatl weight of the aqueous resin dispersion, the organic liquid should be added in two or more separate portions, decanting the supernatant liquid in each case before addition of the next portion. When larger amounts of organic liquid relative to the aqueous resin dispersion are used, the use of separate portions need not be followed. For most purposes the amount of organic liquid may vary from about 8 to about 100 parts by weight, based on the total weight of the aqueous resin dispersion as one part. It is understood, of course, that the exact amount which should be used will vary with the nature of the resin, the nature of the organic liquid, the concentration of the resin, and the temperature at which the process is carried out. The optimum concentration of organic liquid will, in any instance, be varied to suit commercial convenience.

The temperature for carrying out the process is not critical. For commercial convenience it is generally preferred to use a temperature between about 5° C. and room temperature, i. e., up to about 35° C.

The concentration of the resin dispersion which is to be fractionated likewise may vary widely. In general, it is preferred to use the concentration at which the resin is produced, i. e., about 30% solids by weight. However, in practice the concentration may vary from about 20% to about 45% solids by weight.

Resins dried in accordance with the instant invention have many advantages compared with the resin solutions of the prior art. Thus, the dried resins have much greater storage life than do the concentrated dispersions of the resins. Also, the elimination of the large volumes of water which previously were the necessary concomitant of such resins greatly reduces the storage space needed for a given amount of resin. Further, the process of the instant invention eliminates the necessity of paying freight and handling costs on two pounds of water for every pound of resin received. Finally, the presence of major amounts of organic liquids at the final drying step greatly reduces the power consumption from what it would be if only water were present due to the much lower specific heat of organic liquids relative to water.

I claim:

1. A process for drying an aqueous sludge obtained by heating an aqueous solution of a cationic urea-formaldehyde-polyfunctional organic nitrogen base resin to precipitate a fraction therefrom of exceptional utility in producing wet strength paper, said fraction being characterized by being substantially completely retained by the paper when added to water suspension of paper fibers, which comprises adding to said aqueous sludge from about 4 to about 100 parts by weight, based on the total weight of the aqueous sludge as 1 part, of an organic liquid selected from the group consisting of substantially completely water-miscible ethers, ketones and monohydric alcohols, concentrating the resulting dispersions and drying the resin.

2. A process according to claim 1 wherein the organic liquid is a substantially completely water-miscible ether.

3. A process according to claim 1 wherein the organic liquid is a substantially completely water-miscible ketone.

4. A process according to claim 1 wherein the organic liquid is a substantially completely water-miscible monohydric alcohol.

5. A process according to claim 1 wherein the polyfunctional organic nitrogen base is an alkylenepolyamine.

6. The process according to claim 5 whenern the alkylenepolyamine is ethylenediamine.

7. The process according to claim 1 wherein the polyfunctional organic nitrogen base is a polyalkylenepolyamine.

8. The process according to claim 7 wherein the polyalkylenepolyamine is diethylenetriamine.

9. The process according to claim 7 wherein the polyalkylenepolyamine is triethylenetetramine.

10. The process according to claim 7 wherein the polyalkylenepolyamine is tetraethylenepentamine.

11. The process according to claim 9 wherein the organic liquid is methanol.

12. The process according to claim 9 wherein the organic liquid is acetone.

References Cited in the file of this patent

UNITED STATES PATENTS

| | | |
|---|---|---|
| 1,836,553 | Pungs et al. | Dec. 15, 1931 |
| 2,554,475 | Suen et al. | May 22, 1951 |